United States Patent [19]

Daloz

[11] Patent Number: 4,715,245
[45] Date of Patent: Dec. 29, 1987

[54] DEVICE FOR METERING A POWDERED, GRANULAR OR LIQUID PRODUCT, AND APPARATUS INCLUDING A DEVICE OF THE KIND

[76] Inventor: Joanny Daloz, 4 Rue Général Charbonel, 21120 Is Sur Tille, France

[21] Appl. No.: 843,662

[22] Filed: Mar. 25, 1986

[30] Foreign Application Priority Data

Apr. 3, 1985 [FR] France ................................ 8505085

[51] Int. Cl.⁴ .............................................. G05G 1/04
[52] U.S. Cl. ...................................... 74/522; 33/1 V; 177/172; 177/251
[58] Field of Search ............. 73/149, 432 A; 177/172, 177/251; 222/440; 33/1 V; 74/522

[56] References Cited

U.S. PATENT DOCUMENTS 1,435,287 11/1922 Gibson ................................ 177/162
3,382,944  5/1968 Novak ................................. 177/172

FOREIGN PATENT DOCUMENTS 295453 12/1915 Fed. Rep. of Germany .
2238507  2/1974 Fed. Rep. of Germany .
2298997  8/1976 France .
2307502 11/1976 France .
7906356  2/1981 Netherlands .
206673  11/1939 Switzerland .

Primary Examiner—Peter A. Aschenbrenner
Assistant Examiner—Gerald A. Anderson
Attorney, Agent, or Firm—Young & Thompson

[57] ABSTRACT

The device for metering a powdered, granular or liquid product, comprises a metering chamber (1) which has a variable volume.

The metering chamber (1) comprises a wall (2) which is movable within said chamber. The latter is connected to a lever (4) pivotally mounted on an axis (5). The end of the lever opposite the movable wall (2) is associated with first means (9) allowing the lever to be pivoted about its axis and with second means (10) allowing the ratio of the arms of the lever (4) on either side of its pivotal axis (5) to be varied.

For use especially in an apparatus for preparing coffee and for regulating the number of cups and the strength of the coffee.

2 Claims, 7 Drawing Figures

U.S. Patent  Dec. 29, 1987  Sheet 1 of 4  4,715,245
FIG_1
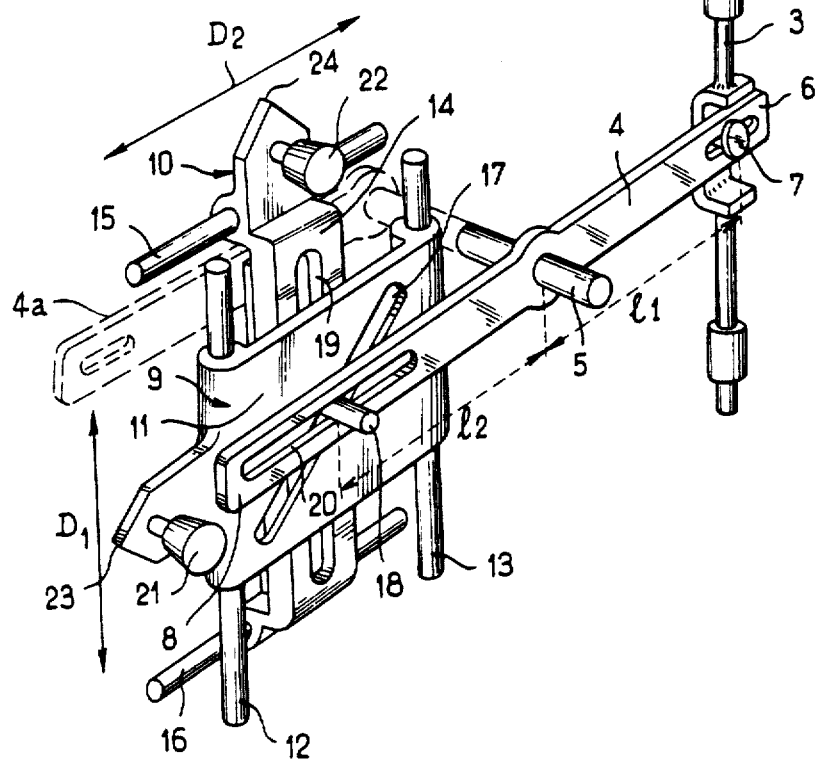
FIG_2
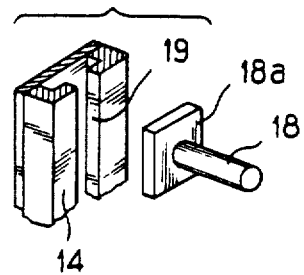

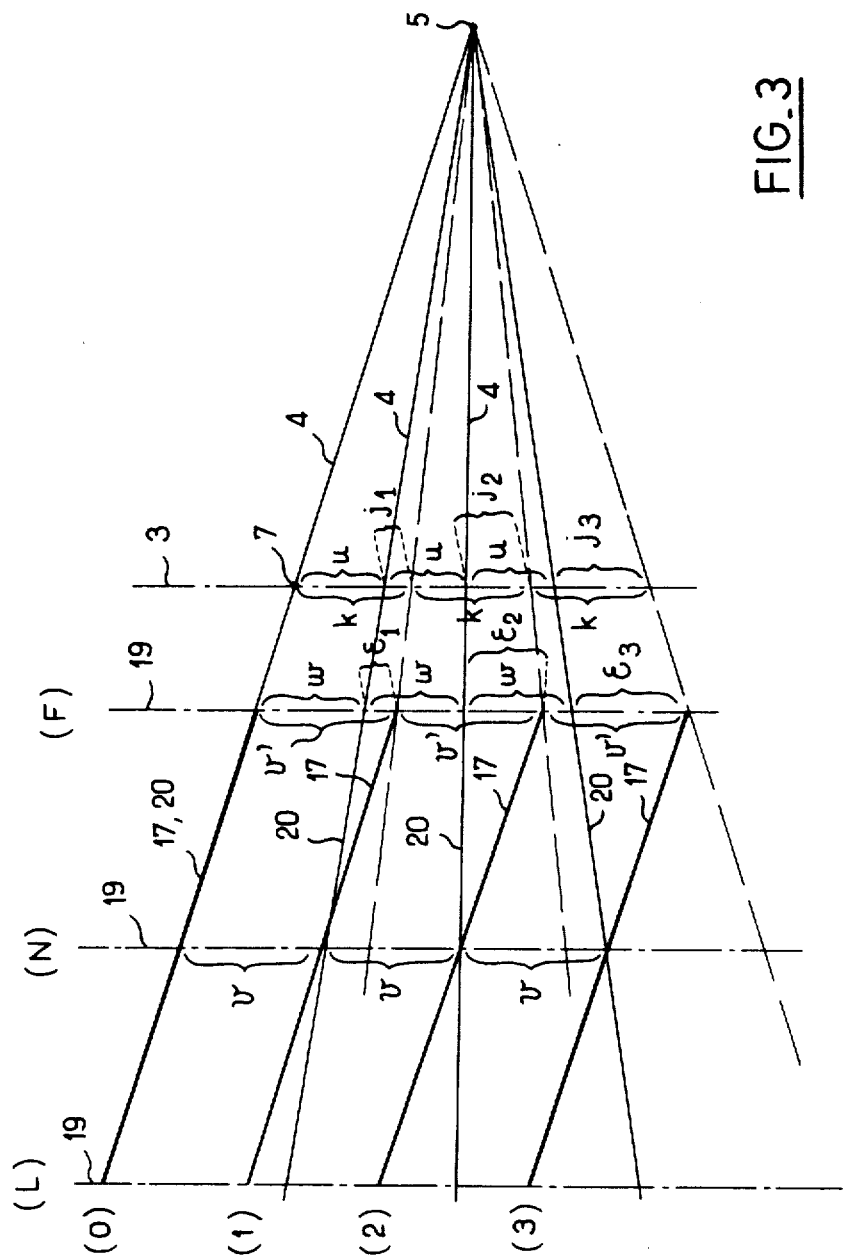
FIG_3

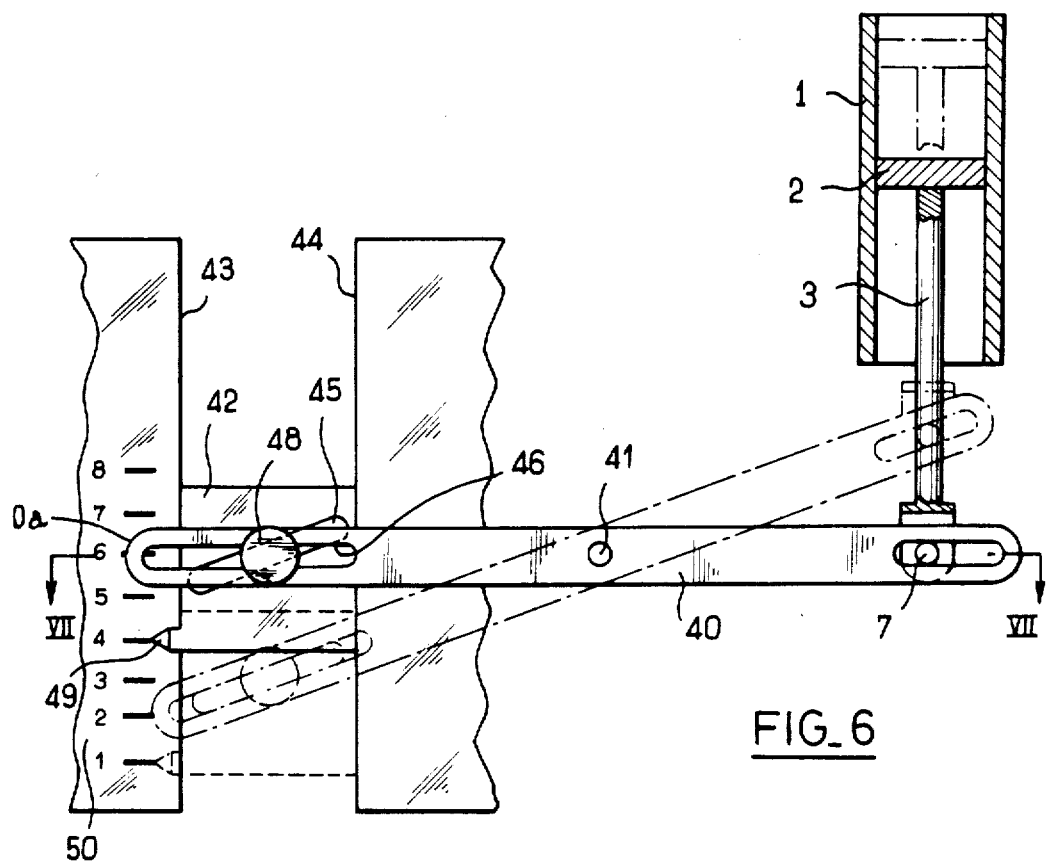
FIG_6
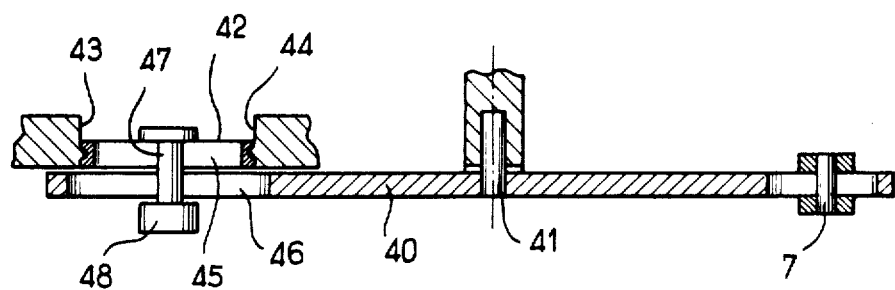
FIG_7

DEVICE FOR METERING A POWDERED, GRANULAR OR LIQUID PRODUCT, AND APPARATUS INCLUDING A DEVICE OF THE KIND

The present invention relates to a device for metering a powdered, granular or liquid product, comprising a metering chamber associated with means for changing the volume of the chamber.

The invention likewise embraces an apparatus, particularly for domestic usage, for preparing a beverage from a powder such as a soluble coffee powder, or from a liquid, comprising a metering chamber associated with a metering device of the type mentioned.

Devices which permit metering of the quantity of coffee introduced into a coffee pot according to the number of cups of coffee and the required strength of the coffee are known, for example according to French patent No. 2 307 502 and U.S. Pat. No. 1,435,287.

In all these devices, the metering and the quantity of coffee are by weight. These devices also require that the container which receives the coffee powder shall be supported upon a weighing system, a factor which seriously complicates the design of coffee pots equipped with such devices.

The apparatus similar to a coffee pot or teapot for domestic use, described in the French patent application filed by the applicant on Apr. 3, 1985 under No. 85 05084 and entitled:

"Dometic appliance using a hydrophilic powder" comprises a fixed metering chamber intended to contain a variable volume of coffee powder or tea powder according to the number of cups or the strength of the coffee or tea which the user wishes to obtain.

The object of the present invention is to create a device which, using simple means, permits one to change the volume of the metering chamber so as to regulate said volume according simultaneously to the number of doses, for example the number of cups of coffee, and the volume of each dose, for example the strength of coffee which it is desired to obtain.

According to the invention, this device is characterized in that the metering chamber comprises a movable wall within said chamber, in that said wall is connected to a lever pivotally mounted on an axis, in that the end of the lever opposite the movable wall is associated with first means permitting the lever to be pivoted about its axis and with second means permitting the ratio of the lever arms on either side of its pivotal axis to be varied.

By acting on the first means, the lever is pivoted and the movable wall of the metering chamber is displaced. Thanks to said first means, it is thus possible to vary the volume of the metering chamber, for example according to the number of cups of coffee desired in the case of a coffee pot.

By acting on the second means, the ratio of the lever arms on either side of its pivotal axis is varied, so that the lever effects a greater or lesser displacement, for a displacement of an amplitude determined by the first means. It is thus possible to regulate the volume of the dose, for example according to the strength of coffee or of tea which the user wishes to prepare.

Thus the user, for example in the case of a coffee pot, is able to predetermine the number of cups of coffee and the strength of the coffee which he wishes to obtain.

According to an advantageous version of the invention, the metering chamber is a cylinder in which a piston with an axial piston rod is slideably mounted, the end of the lever opposite the first and second means being articulated to this piston rod.

According as the lever pivots about its axis, its end articulated to the piston rod displaces the piston, thereby varying the volume of the metering chamber.

According to a preferred version of the invention, the first and second means comprise respective control knobs and means for guiding the displacement, abutments for limiting the extent of displacement of these means, and means for immobilizing these first and second means in a given position.

These control knobs are advantageously associated with respective graduated scales, showing for example the number of cups and the strength of the coffee or the tea which the user wishes to obtain.

Further details and advantages of the invention will be apparent from the following description.

In the attached drawings, given by way of non-limiting example:

FIG. 1 is a perspective view of a first embodiment of the metering ice according to the invention;

FIG. 2 is an exploded perspective view of two parts of the device according to FIG. 1;

FIG. 3 is a diagram showing various positions occupied by the members of the device according to the invention, for different settings of the latter;

FIG. 6 is a schematic elevation of a fourth embodiment of the device according to the invention;

FIG. 7 is a section taken in the plane VII—VII of FIG. 6.

Figure 4:
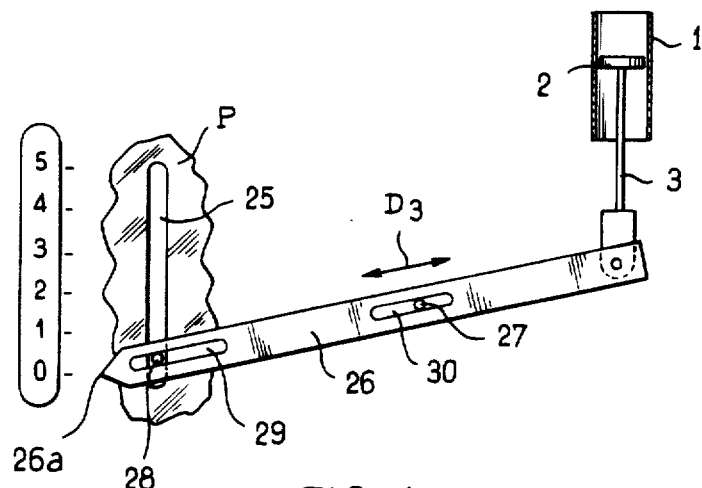
FIG. 4 is a schematic elevation of a second embodiment of the device according to the invention.

The device shown in FIG. 1 is intended e.g. for equipping a coffee pot which uses soluble coffee powder, such as the one described in French patent application No. 85 05084 filed by the applicant on Apr. 3, 1985 and entitled: "Domestic appliance using a hydrophilic powder".

This coffee pot comprises a metering chamber intended to be filled with coffee powder, consisting of a cylinder 1 having its axis substantially vertical, in which a piston 2 having an axial piston rod 3 is slideably mounted. A lever 4 extends transversely to this piston rod 3 and, at approximately its mid-point, has a pivotal axis 5 which is stationary and is substantially perpendicular to the piston rod 3.

The end 6 of the lever 4 is articulated to the piston rod 3 about an axis 7 parallel to the pivotal axis 5.

The end 8 of the lever 4 opposite the pivotal axis 7 is, in accordance with the invention, associated with first means 9 allowing the lever 4 to be pivoted about its fixed axis 5, and with second means 10 permitting the ratio of the lengths 11 and 12 of the arms of the lever 4 on either side of its pivotal axis 5 to be varied.

In the embodiment of FIG. 1, the first means 9 comprise a plate 11 slideably mounted on two fixed parallel guides 12, 13, having a rectilinear locus $D_1$ transverse to the lever 4 and perpendicular to its axis 5.

The second means 10 comprise a plate 14 substantially parallel to the plate 11 of the first means and mounted to slide on two fixed guides 15, 16 having a rectilinear locus $D_2$ substantially perpendicular to the straight line of displacement $D_1$ of the first means 9.

The plate 11 of the first means 9 presents an elongate opening 17 inclined with respect to the line of displacement $D_1$ of that plate. A finger 18 is slideably engaged in this opening 17 and retained by a heel 18a in an elongate opening 19 made in the plate 14 of the second means 10, and extending substantially parallel to the straight line of displacement $D_1$ of the plate 9 of the first means (see also FIG. 2).

The finger 18 is likewise engaged in an elongate opening 20 provided near the end 8 of the lever 4 opposite the metering chamber 1, and extending along the axis of the lever 4.

It can also be seen that each of the plates 11, 14 has a respective control knob 21, 22 accessible to the user, and allowing him manual displacement of the plate 11 along the straight line $D_1$ and of the plate 14 along the straight line $D_2$.

Beside the control knob 21 is located a pointer 23 which can move along the straight line $D_1$. A fixed graduated scale (not shown) is disposed adjacent this pointer 23 showing the number of cups which the user wishes to prepare.

A pointer 24 which can move along the direction $D_2$ is likewise located adjacent the control knob 22. A fixed graduated scale (not shown) is disposed adjacent this pointer 24 showing the strength of the coffee which the user wishes to prepare.

The operation of the device just described is as follows:

The control knob 22 having been fixed, e.g. in the centre of its range, corresponding to coffee of normal strength, while the user pushes the control knob 21 upwards, the lever pivots about its axis 5 and its end 6 dips, drawing the piston 2 downward. The user thus increases the volume of the metering chamber 1, and, as a result, the number of cups which he wishes to obtain.

Conversely if he wants a smaller number of cups of coffee, the user pushes the control knob 21 downwards, which has the effect of displacing the piston 2 upwards, thereby reducing the volume of the metering chamber 1.

Moreover if for a given number of cups fixed by the position of the control knob 21, the user desires coffee stronger than the mean strength indicated by the pointer of the control knob 22, he pushes it to the right in FIG. 1, thereby curtailing the length 12 of that arm of the lever defined between the finger 18 and axis 5, and causing pivoting of the lever 4, displacement of the piston 2 downwards and an increase in the volume of the metering chamber 1. This increase of volume causes a larger quantity of coffee to be dispensed for a given number of cups, and the coffee is correspondingly stronger.

Conversely, if the user wishes to reduce the strength of the coffee, he pushes the control knob 22 towards the left in FIG. 1, so that the lever 4 is depressed and pushes the piston upwards.

The operation of the device according to the invention is explained in greater detail and in a more theoretical manner by reference to the diagram shown in FIG. 3.

The successive positions (0), (1), (2), (3) of the lever 4 pivoting about its axis 5 are symbolized by a series of lines 4 converging at the axis 5 of the lever.

The successive positions (L), (N), (F) (weak, normal and strong coffee) of the elongate opening 19 are symbolized by three vertical lines 19.

The successive positions of the elongate opening 20 for different doses are symbolized by lines 20 which are collinear with the lines 4 symbolizing the lever 4.

Between the two positions (N) and (F), the lever 4 includes the elongate opening 17 which is provided on the plate 11. The piston rod of the piston 2 is symbolized by a vertical line 3, its articulation to the lever 4 being shown by the point of intersection 7.

In the position (0), the elongate openings 17 and 20 are coincident.

The displacements from position (1) to (2) and from (2) to (3) in the position (N) (normal coffee) are equal and have the value v. The piston rod 3 of the piston is displaced at the same time along successive distances having values u proportional to the values v.

In the position (F) (strong coffee), the displacements are the same viz v', since the elongate opening 17 is displaced along its own axis.

The piston rod 3 of the piston 2 is displaced by proportional distances k which are themselves equal.

Along the elongate opening 14 in the position (F) (strong coffee), the arm 4 is displaced by a proportional value w for each displacement (1) to (2), (2) to (3) etc . . . It can be shown that the differences v−w for each of the positions are such that $\epsilon_2 = 2\epsilon_1$, i.e. integral multiples.

The displacements of the piston rod 3 of the piston 2 and the consequent variations in the volume dispensed, remain proportional to the displacements of the lever 4.

The values k of these displacements are thus themselves equal, and the differences $k-u = j_1, j_2, j_3$ are such that $j_2 = 2j_1, j_3 = 3j_1$, etc . . .

In FIG. 4 there is schematically shown a first embodiment of the device according to the invention.

In this embodiment, the first means comprise an elongate opening 25 extending transversely with respect to the lever 26, located in a fixed plane P substantially perpendicular to the pivotal axis 27 of the lever 26. A finger 28 is engaged in this opening 25 and in an elongate opening 29 disposed in the lever 26 which extends along the axis of the latter adjacent its end 26a opposite the metering chamber 21.

The second means comprise an elongate opening 30 disposed between the two opposed ends of the lever 26 and following its axis, in which the pivotal axis 27 of the lever 26 is movably engaged following a straight line $D_3$, said lever being in the position corresponding to zero dosage. Adjacent the end 26a of the lever 26, which forms a pointer, there is disposed a graduated scale 0, 1, 2, 3, 4, 5.

As the pivotal axis 27 is diplaced along the straight line $D_3$, the length ratio of the lever arms on either side of this axis 27 is changed, as is the dose volume, i.e. the strength of coffee for a given number of cups indicated by the pointer 26a.

As the pointer 26a is diplaced upwards, the volume of the metering chamber 1 is likewise increased in order to increase the number of cups.

Figure 5:
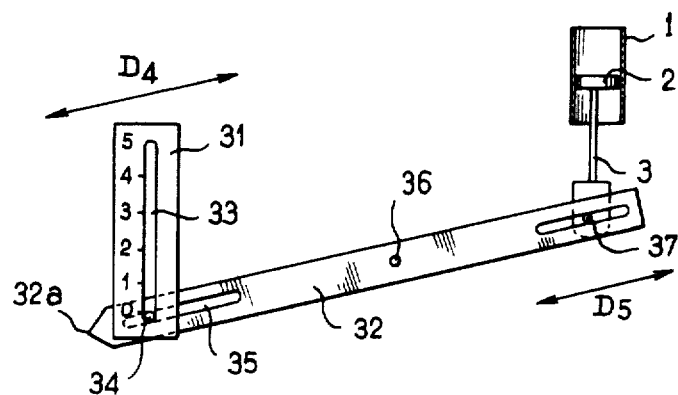
FIG. 5 is a schematic elevation of a third embodiment of the device according to the invention.

In the embodiment according to FIG. 5, the first means comprise a plate 31 substantially parallel to the lever 32 and having an elongate opening 33 disposed transversely of the lever 32. A finger 34 is engaged in this opening 33, and in an elongate opening 35 made in the lever 32. The latter extends along the axis of said lever adjacent its end 32a opposite the metering chamber 1. The pivotal axis 36 of the lever 32 is fixed.

The second means comprise the fact that the plate 31 is displaceable along a straight line $D_4$ substantially parallel to the longitudinal axis of the lever 32, when the latter is in the position corresponding to zero dosage. The plate 31 carries a graduated scale adjacent the elongate opening 33.

As the plate 31 is displaced along the line $D_4$, the length ratio of the lever arms on either side of the fixed axis 36 is changed, and the volume of the dose is changed, i.e. the strength of the coffee for a given number of cups as determined by the position of the finger 34 in the elongate opening 33.

As this finger 34 is displaced upwards, the volume of the metering chamber 1 is likewise increased, so as to increase the number of cups.

In the embodiment according to FIG. 5, instead of making the plate 31 movable along a straight line $D_4$ it is possible to make movable the articulation point of the piston rod 3 along a line $D_5$ substantially parallel to the longitudinal axis of the lever 32 when the latter is in the zero position. The displacement of the articulation point 37 is made possible either by making the entire metering device 1, 2, 3 movable by providing an articulation on the piston rod 3 so that the point 36 can be displaced transversely while the cylinder 1 remains stationary.

An identical result is obtained by making the axis 36 and the plate 31 movable as a unit along a straight line $D_4$.

In the embodiment according to FIGS. 6 and 7, the lever 40 is pivotable about a fixed axis 41, and its end 40a opposite the metering chamber 1 is made integral with a unit consisting of a plate 42 slideably mounted on two parallel guides 43, 44, transverse to the lever 40. This plate 42 comprises an elongate opening 45, inclined with respect to the guides 43, 44. The end 40a of the lever 40 presents an elongate opening 46 aligned in the direction of the lever 40, the end 40a of the lever being made into a unit with the plate 42 by a finger 47 having a milled knob 48 engaged in the elongate openings 45, 46 provided in the lever 40 and in the plate 42. The finger 47 can move within said elongate openings 45, 46.

Adjacent a pointer 49 of the plate 42 there is disposed a graduated scale 50 carrying numbers indicating the desired number of cups of coffee.

In the position shown in FIG. 6, the pointer 49 coincides with the number 4 which indicates that the volume of the metering chamber 1 defined by the piston 2 corresponds to four cups of coffee. If it is desired to increase the number of cups of coffee, the pointer 49 is displaced upward. Conversely, if it desired to reduce the number of cups of coffee the pointer is displaced downward, for example as far as the number 1 (see the position of the lever 40 and the piston 2 indicated in broken outline).

In the position shown in FIG. 6, the milled knob 48 of the finger 47 is located at the centre of the elongate opening 45 and thus corresponds to a medium strength of coffee. If it is desired to increase the stength of the coffee, the milled knob 48 is displaced to the right, causing the lever 40 to pivot downward, having regard to the inclination of the elongate opening 45 with respect to the guides 43, 44, and the piston 2 is displaced downward, increasing the volume of the chamber 1. If it is desired to reduce the strength of the coffee, the milled knob 48 is displaced to the left.

It will be understood that the invention is not limited to the specific embodiments described above, and many variations can be included without departing from the scope of the invention.

The device in accordance with the invention can thus be applied to all apparatus, whether domestic or not, having a metering chamber of variable volume intended to contain a powdered, granular or liquid product in which it is desired to be able to vary the volume of each unit dose and the number of unit doses.

It will also be understood that the device can include appropriate means for arresting the moving parts of the device in various positions.

Moreover, the metering chamber could be other than cylindrical, the essential feature being that it possesses a movable or deformable wall for varying its internal volume.

Furthermore the lever, instead of being straight, could have an arm 4a (shown in broken outline in FIG. 1) which is not a straight extension of the other arm, if that should prove necessary for reducing the bulk of the device.

I claim:

1. Device for metering a powdered, granular or liquid product, having a metering chamber (1) of variable volume, associated with means for changing the volume, the metering chamber (1) comprising a movable wall (2) within said chamber, said wall (2) being connected to an end of a lever (4), (26), (32) pivotally mounted about an axis (5), (27), (36), an end of the lever opposite the movable wall (2) being associated with first means (9), (25), (28), (33), (34) allowing the lever to be pivoted about said axis, and with second means (10), (27), (30), (31), (35) allowing the length of the lever (4), (26), (32) on one side of said pivotal axis (5), (27), (36) to be varied relative to the length of the lever on the other side of said axis, said first means (9) comprising a plate (11) mounted for sliding along a fixed straight line ($D_1$) which is transverse to the lever (4) and to said axis (5), said second means (10) comprising a plate (14) substantially parallel to the plate (11) of the first means and mounted for sliding along a fixed straight line ($D_2$) substantially perpendicular to the straight line ($D_1$) of displacement of the first means, said plate (11) of the first means having an elongated opening (17) inclined with respect to the straight line ($D_1$) of displacement of said plate of the first means, a finger (18) mounted to slide in said elongated opening (17) and in an elongated opening (19) provided in the plate (14) of the second means, and extending substantially parallel to the straight line ($D_1$) of displacement of the plate (11) of the first means, said finger (18) being likewise engaged in an elongated opening (20) provided near said end (8) of the lever (4) opposite the metering chamber (1) and extending lengthwise along said lever, said pivotal axis (5) of the lever being fixed with respect to the lever.

2. Device according to claim 1, and a control knob (21), (22) fixed on each of the plates (11), (14).

* * * * *

UNITED STATES PATENT AND TRADEMARK OFFICE
CERTIFICATE OF CORRECTION

PATENT NO. : 4,715,245
DATED : December 29, 1987
INVENTOR(S) : Joanny DALOZ

It is certified that error appears in the above—identified patent and that said Letters Patent is hereby corrected as shown below:

In the heading of the patent, insert the name of the assignee, as follows:

[73]   Assignee:   SEB S.A., Selongey, France

Signed and Sealed this

Fifth Day of July, 1988

*Attest:*

DONALD J. QUIGG

*Attesting Officer*   *Commissioner of Patents and Trademarks*